US009499972B2

(12) United States Patent
Kaddas et al.

(10) Patent No.: US 9,499,972 B2
(45) Date of Patent: Nov. 22, 2016

(54) ELECTRICAL COMPONENT COVER FOR PROTECTING WILDLIFE

(71) Applicant: Kaddas Enterprises, Inc., Salt Lake City, UT (US)

(72) Inventors: James J. Kaddas, Herriman, UT (US); David E. Miller, West Valley City, UT (US)

(73) Assignee: Kaddas Enterprises Inc., Salt Lake City, UT (US)

( * ) Notice: Subject to any disclaimer, the term of this patent is extended or adjusted under 35 U.S.C. 154(b) by 203 days.

(21) Appl. No.: 14/231,592

(22) Filed: Mar. 31, 2014

(65) Prior Publication Data
US 2014/0209502 A1 Jul. 31, 2014

Related U.S. Application Data

(63) Continuation of application No. 13/464,723, filed on May 4, 2012, now Pat. No. 8,723,056.

(51) Int. Cl.
| | |
|---|---|
| *H01B 17/00* | (2006.01) |
| *H02B 1/06* | (2006.01) |
| *H05K 5/00* | (2006.01) |
| *B65D 85/00* | (2006.01) |
| *E04B 1/72* | (2006.01) |
| *H02G 7/00* | (2006.01) |

(52) U.S. Cl.
CPC ........ *E04B 1/72* (2013.01); *H02G 7/00* (2013.01); *Y10T 29/49002* (2015.01)

(58) Field of Classification Search
CPC ...... E04B 1/72; Y10T 29/49002; H02G 7/00
USPC ............ 174/5 R, 50, 135, 139, 520; 206/722
See application file for complete search history.

(56) References Cited

U.S. PATENT DOCUMENTS

| | | | |
|---|---|---|---|
| 3,824,676 A | 7/1974 | Ebert | |
| 4,449,010 A * | 5/1984 | Apperson | ............... H02G 7/00 174/5 R |
| 4,709,121 A | 11/1987 | Shores | |
| 4,845,307 A | 7/1989 | Cumming et al. | |
| 5,153,383 A | 10/1992 | Whited et al. | |

(Continued)

FOREIGN PATENT DOCUMENTS

| | | |
|---|---|---|
| WO | 9734306 A1 | 9/1997 |
| WO | 2011/094870 A1 | 11/2011 |

OTHER PUBLICATIONS

International Preliminary Report on Patentability from PCT App. No. PCT/US2013/039563, dated Nov. 13, 2014.

(Continued)

*Primary Examiner* — Sherman Ng
(74) *Attorney, Agent, or Firm* — Snow Christensen & Martineau; Randall B. Bateman; Sarah W. Matthews

(57) ABSTRACT

An electrical component cover may include a first portion and a second portion which are hingedly attached to one another and at least one projection extending from one of the first portion and the second portion. A locking member engages the at least one projection so as to hold the first portion and second portion together to cover an electrical component disposed in a void defined by the first portion and the second portion.

21 Claims, 6 Drawing Sheets

(56) References Cited

U.S. PATENT DOCUMENTS

| | | | |
|---|---|---|---|
| 5,293,721 A | 3/1994 | Richard et al. | |
| D357,458 S | 4/1995 | Tisbo | |
| 5,485,307 A | 1/1996 | Kim | |
| 5,525,073 A | 6/1996 | Sampson | |
| 5,873,324 A | 2/1999 | Kaddas et al. | |
| 6,005,196 A | 12/1999 | Spillyards | |
| 6,255,597 B1 | 7/2001 | Bowling et al. | |
| 6,291,774 B1 | 9/2001 | Williams | |
| 6,303,870 B1 | 10/2001 | Nazaryan et al. | |
| 6,486,785 B1 | 11/2002 | Hoth | |
| 6,995,313 B1 | 2/2006 | Barnett et al. | |
| 7,075,015 B1 | 7/2006 | Rauckman | |
| 7,154,034 B2 | 12/2006 | Lynch | |
| 7,276,665 B1 * | 10/2007 | Rauckman | H01B 17/00 174/135 |
| 7,309,837 B1 | 12/2007 | Rauckman et al. | |
| 7,622,668 B1 | 11/2009 | Tollefson et al. | |
| 7,772,499 B2 | 8/2010 | Rauckman | |
| 7,839,256 B2 | 11/2010 | Bradford et al. | |
| 2003/0015330 A1 | 1/2003 | Wood et al. | |
| 2003/0043545 A1 | 3/2003 | Ivey et al. | |
| 2008/0123254 A1 | 5/2008 | Niles | |
| 2011/0083896 A1 | 4/2011 | Hiller et al. | |
| 2011/0192627 A1 | 8/2011 | Niles et al. | |

OTHER PUBLICATIONS

Written Opinion of the International Preliminary Examining Authority from related PCT Patent Application No. PCT/US13/39563, May 3, 2013.

* cited by examiner

ELECTRICAL COMPONENT COVER FOR PROTECTING WILDLIFE

BACKGROUND

1. Field of the Invention

The present invention relates to a protective cover for use with electrical components for protecting wildlife and an electrical system. In particular, the present invention relates to a protective cover to prevent accidental short circuits created by wildlife contacting conductors of the electrical system.

2. State of the Art

In the conveyance of electricity over power lines it is necessary to periodically support the power line and to connect lines for distribution to various locations. Each of these functions typically occurs in a power pole. The power pole is typically made of metal or wood and may include a cross member to which one or more insulator bushings are attached. A power line is attached to the insulator bushing in such a manner that the insulator bushing electrically isolates the power line from the pole. In many situations, the power pole will have at least three lines, one acting as the positive, one acting as the negative and the third acting as a ground.

While insulator bushings are effective at preventing the transfer of power from the power line to the power pole, the presence of the power line creates a potential hazard for various forms of wildlife. Birds such as owls, eagles, and other predators often like to perch on the cross member or the top of a power pole because it provides good visibility. In many environments, the power pole is the tallest item around and thus provides the bird with a commanding view of the surrounding environment as they search for prey.

While the power pole is convenient for prey spotting, it can also be deadly for the bird. If a bird stretches its wings while attempting to take flight or to simply maintain its balance, the wings can contact two different lines. When this is accomplished, the bird completes an electrical circuit between the two lines and can be electrocuted immediately. Not only is the bird killed, but short circuiting the lines can cause considerable damage to the electrical lines and can cause power outages. Thus it is advantageous to avoid contact between a bird and power line while the bird is disposed on the cross member.

While large birds are a major concern, they are not the only cause of damage to electricity systems. Squirrels, raccoons and other climbing animals can also climb power poles and other electrical support structures and inadvertently come into contact with two different conductors, thereby killing the animal and potentially damaging the electrical system and/or causing blackouts. Likewise, while discussed above in the context of utility poles, it will be appreciated that there are a variety of situations in which power lines present a hazard to wildlife, and vice versa, such as at power substations and other locations in which an animal contacting a power line can short circuit the system or serve as a path to ground for the electricity.

While a utility company faces economic loss due to damage to the electrical system caused by the bird, it may also be subject to liability under various environmental protection laws and/or species preservation laws. Many large raptors and other predatory birds are covered by the Endangered Species Act. If such a bird is killed, a utility company may be subject to civil fines and potentially, criminal penalties if the utility company has not taken adequate steps to prevent harm to wildlife. These fines can be as large as $10,000 for a first offense and quickly escalate if it is apparent that the utility company is not taking reasonable precautions to prevent harm to protected wildlife. Thus, it is advantageous to provide improved protection against accidental electrocution of animals.

To this end, it is desirable to provide covers which lessen the likelihood of an animal coming in contact with the bushing or power line. One challenge with such covers is finding a mechanism for conveniently placing the cover over the insulator bushing or other structure. There are presently covers which contain two segments which are pivotally mounted on one side and which can be closed to surround the bushing and a portion of a conductor. Some devices require a snap engagement closure to hold the two segments together. Other devices are spring loaded such that advancing the cover onto a bushing trips the spring so that the two halves snap together, thereby holding the device on the bushing. There are disadvantages to such systems. Namely, if the spring fails or if the latching mechanism disengages, the cover may inadvertently be removed from the insulator bushing. Additionally, the spring mechanism is often conductive. Thus there is a need for an improved electrical component cover for protecting wildlife.

SUMMARY OF THE INVENTION

An improved electrical component cover for protecting wildlife may include a body having a first portion and second portion which are hingedly mounted to one another so as to enable the body to surround a portion of a bushing or other component of an electrical system.

A manually controlled blocking member may be disposed such that when the blocking member is disposed in a first position, the blocking member does not prevent the first portion and the second portion from moving away from each other at a far side generally opposite a hinge so as to move the body into an open position wherein a bushing and/or electrical components can be moved into a void defined by the body. The manually controlled blocking member may also be configured such that when the blocking member is disposed in a second position, the blocking member engages portions of the body or extensions attached thereto to prevent the first portion and the second portion from being moved away from each other at a location opposite the hinge. In other words, when the blocking member is disposed in the second position, the body may be locked closed. Moreover, the blocking member may be configured such that moving the locking member from the first position to the second position may force the two portions of the body toward each other opposite the hinge, to thereby move the body from an open position to a closed position.

In accordance with one aspect of the invention, each portion of the body may have a projection which engages the locking member such that movement of the locking member into the second position pivots the projections relative to the hinge and thereby moves the projections away from one another forcing the two portions of the cover body to move toward each other to thereby close the cover.

In accordance with another aspect of the invention, the locking member is an eyebolt which can be rotated into a position wherein it allows the portions of the cover body to be moved away from each other so as to open the cover, and rotated into a position wherein the eyebolt engages portions of the cover so as to force the cover to remain closed.

In accordance with another aspect of the invention, the locking member may be grasped by a hot stick or similar grasping device for use in placing the cover adjacent the electrical component. Once the cover is in place, the grasping device can be used to rotate the locking member so as to force the cover closed and to maintain it in a locked position until the locking member is rotated back into the first position.

BRIEF DESCRIPTION OF THE DRAWINGS

The drawings will now be discussed so as to enable one of ordinary skill in the art to make it easy to use the invention. It will be appreciated that the drawings provide only illustrative examples of the invention and that the invention is not limited thereby. Additionally, it will be appreciated that not all aspects of the invention can be shown in a particular drawing and that multiple drawings may be used to demonstrate the invention as a whole.

DETAILED DESCRIPTION

The invention and accompanying drawings will now be discussed in reference to the numerals provided therein so as to enable one skilled in the art to practice the present invention. The drawings and descriptions are exemplary of various aspects of the invention and are not intended to narrow the scope of the appended claims. It will be appreciated that various embodiments may achieve various aspects and advantages of the present invention and there is no requirement that any embodiment achieve all of the aspects or advantages of the invention.

Figure 1:
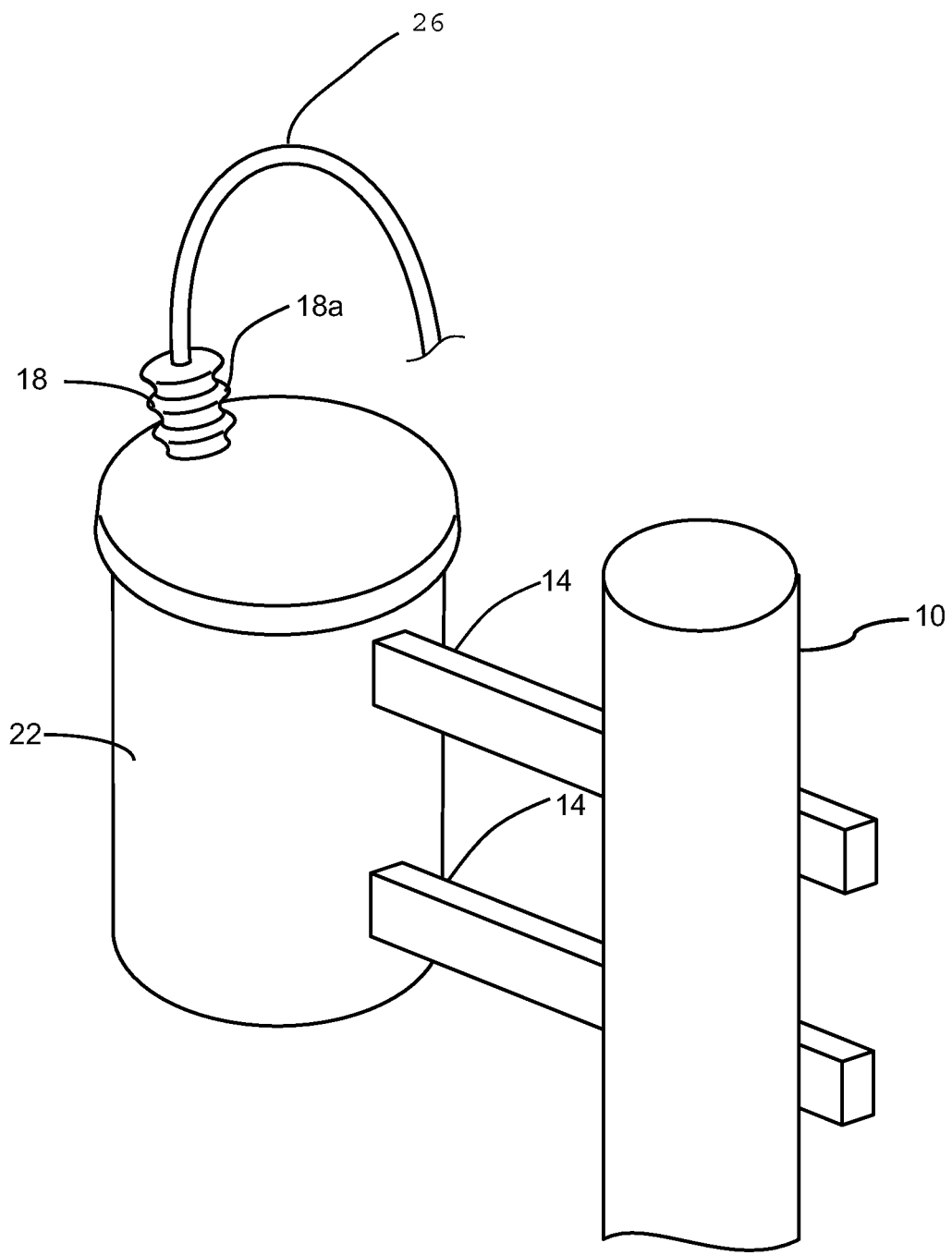
FIG. 1 shows a perspective view of a bushing and conductor formed in accordance with the prior art.

Turning now to FIG. 1 there is shown a perspective view of components of a power line system. The components include a power pole 10 having one or more cross members 14 to which an insulator bushing 18 is attached. As shown in FIG. 1, the insulator bushing 18 is attached to a transformer 22. However, it will be appreciated that there are a wide variety of uses of insulator bushings and that FIG. 1 is merely to give one illustrative example.

The insulator bushing 18 spaces a conductor or power line 26 from the cross member 14 and/or other structures to prevent the conductor from coming into contact with anything which can cause a short by serving as a ground for whereby electricity can pass. The skirts 18a on the bushing 18 help to maximize the insulative properties. However, if a bird, squirrel, raccoon or other animal climbs on the insulator bushing 18, the animal may connect two conductors, thereby forming a circuit. This usually kills the animal and can damage the electrical components and/or cause disruption in electrical service to customers. While power poles present a problem, substations and other structures are also problematic for wildlife.

Figure 2:
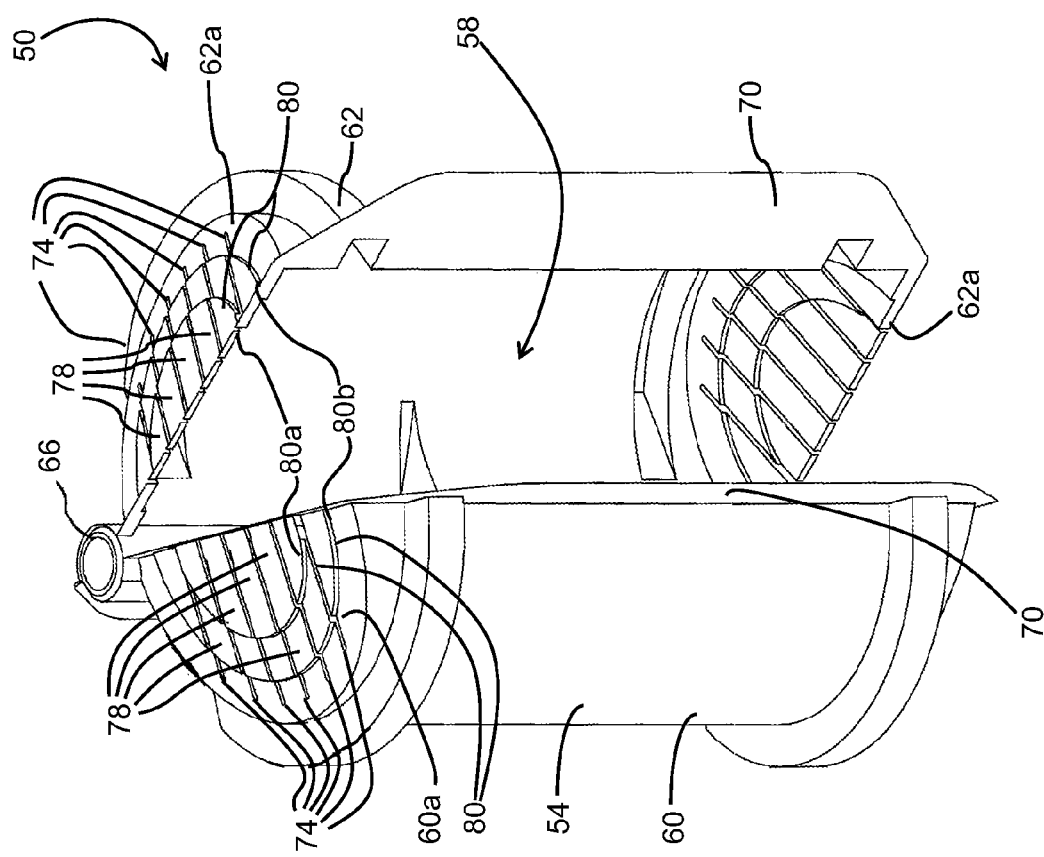
FIG. 2 shows a perspective view of an electrical component cover formed in accordance with the principles of the present invention in a first, open position.

Turning now to FIG. 2, there is shown a perspective view of an electrical component cover, generally indicated at 50, for protecting wildlife in accordance with the principles of the present invention. The electrical component cover 50 includes a body 54 which defines a void 58 for receiving an electrical component, such as the upper portion of an insulator bushing and/or a portion of a conductor.

Figure 3:
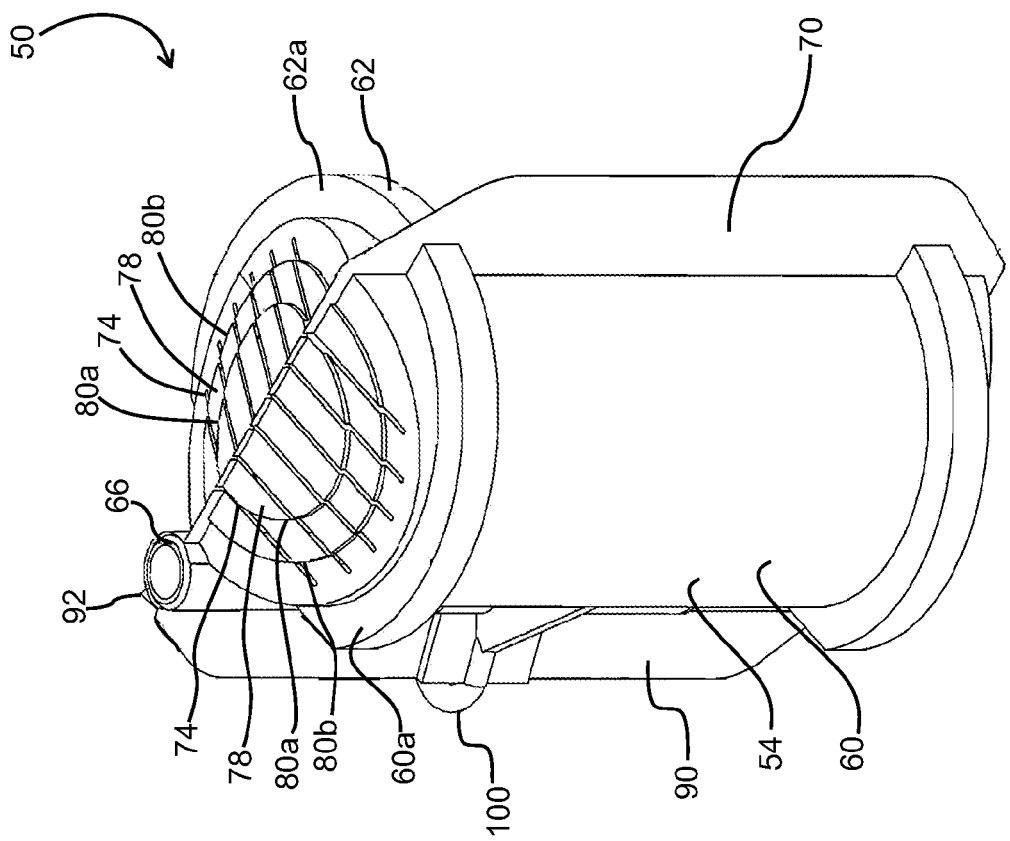
FIG. 3 a perspective view of the electrical component cover shown in FIG. 2, but with the cover in a second, closed position.

The cover body 54 may be formed by a first body portion 60 and a second body portion 62. The two body portions 60 and 62 may be configured to substantially surround an electrical component to thereby protect it against contact with birds, squirrels and the like. The first body portion 60 and the second body portion 62 may be pivotally or hingedly attached to one another, such as by hinge 66. The hinged engagement enables the body portions 60, 62 to be moved away from each other, at an end opposite the hinge, for mounting on or removal from an electrical component when in a first, open position as shown in FIG. 2. Likewise, the first body portion 60 and the second body portion 62 may be moved toward each other into a second, closed position, as shown in FIG. 3. (As discussed herein, references to the body portions 60, 62 moving away or toward each other references the majority of the body and in particular the portion furthest from the hinged engagement. It will be appreciated that in a hinged engagement, a portion of the body portions may actually move toward one another while the majority of the portions are moving away from each other.)

Disposed at or adjacent an end of one or both of the body portions 60, 62 opposite the hinge 66 may be a flange 70. The flange(s) 70 may be used to help channel an insulator bushing or other electrical component into the void 58 in the body 54 when the cover is in the first, open position shown in FIG. 2.

Also shown in FIG. 2 are a plurality of slots 74 formed into at least one of the upper and lower ends 60a, 62a, respectively, of one or more of the body portions 60, 62. The slots 74 divide the end into a plurality of fingers 78 which allow a portion of the end to be bent or broken to accommodate conductors and the like extending through the end. Additionally, one or more generally semi-annular steps or scores 80 may be provided. The scores 80 may facilitate breaking or bending of the fingers 78 at a particular location to leave an opening of a desired size. Thus, as shown in FIG. 2, the fingers may be broken at a first score 80a to receive a small insulator bushing, or at a second score 80b to form a larger hole to receive a large insulator bushing. By having fingers 78 so configured, either end of the cover 50 can receive a bushing or can simply receive a conductor, and the line worker mounting the cover may be able to configure the cover on site. In use, the cover 50 would be attached to a hot stick or shot-gun stick, as they are commonly called, and advanced over the structure to be enclosed with the flange(s) 60 helping to align the structure in the void.

Turning now to FIG. 3, there is shown a cover 50 which has been moved into the second, closed position so as to enclose a structure held between the first portion 60 and second portion 62 of the body 54. The parts have been numbered consistently with the numbers of FIG. 2, with the exception that only some of the slots 74 and fingers 78 have been numbered for clarity. Extending from the first portion 60 is a first projection 90. While shown in FIG. 3 as extending substantially the length of the body 54, the projection 90 may be much smaller for reasons which will be discussed below.

The projection 90 may be formed as part of the first portion 60 and extends outwardly so that a portion of the projection 90 is disposed functionally on the opposite side of the hinge 66 from where the first portion 60 of the body 54 connects to the hinge 66. In other words, the projection 90 and a similar projection 92 extending from the second section (barely visible in FIG. 3) move opposite the first portion 60 and the second portion 62. When the first and second portions 60, 62 move away from each other into the first, open position, the projections 90 and 92 move toward one another due to their being functionally on the opposite side of the hinge 66. Moving the projections from a first, closed position wherein the projections are close together (correlating with the first, open position shown in FIG. 2), wherein the projections are moved away from each other, moves the two portions 60, 62 of the body 54 toward each other and into the second, closed position shown in FIG. 3. Thus, moving the projections 90, 92 toward one another causes the cover 50 to open, and moving the projections away from one another causes the cover to close.

The projections 90 and 92 may cooperate with a locking member 100. The locking member is movable between a first position, wherein the locking member 100 does not force the projections 90, 92 into the second, open position, and a second position, wherein the locking member prevents the projections 90, 92 from being moved into the second, open position (which correlates with the portions 60 and 62 being in the second, closed position. As will be explained below, this may be done by rotating the locking member 100 between a first orientation wherein a portion of the locking member 100 having a long axis is generally in parallel alignment with the length of the body 54, to a second orientation wherein the long axis of the locking member is generally perpendicular to the length of the body, thereby keeping the projections 90, 92 in the second, open position. The locking member 100 may be, for example, an eye-bolt. (It will be appreciated that the locking member could be formed so as to engage a single projection—such as the locking member being attached in such a way that it functionally limits the movement of one of the portions while the engagement of the projection and the locking member prevent movement of the other.)

Figure 4:
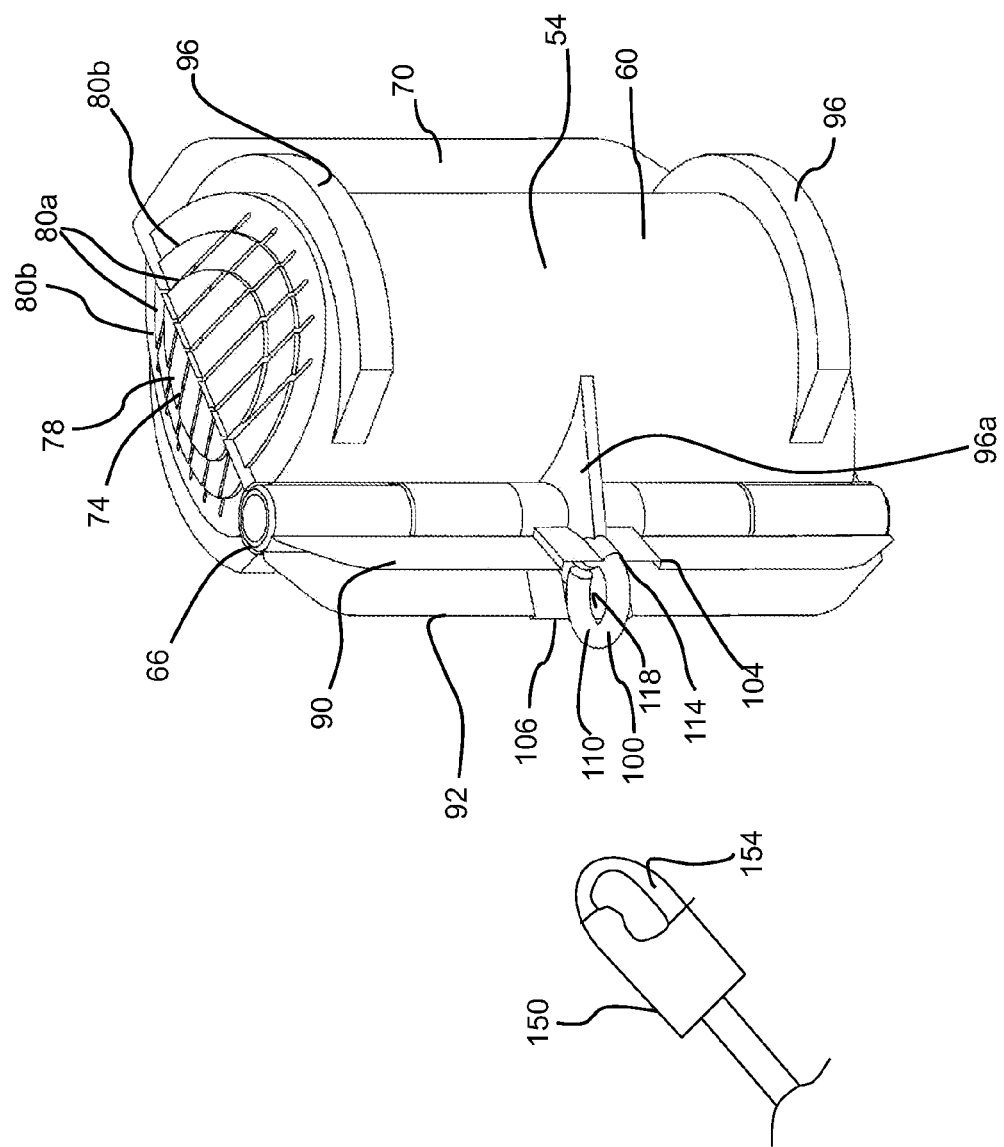
FIG. 4 shows a rear view of the electrical component cover of FIG. 1 with the cover locked in the second, closed position, and a fragmented view of a hot stick or shotgun stick used for remotely locking the cover.

Turning now to FIG. 4, there is shown a rear perspective view of the cover 50, and a fragmented view of an end of a hot stick or shot-gun stick (as they are commonly called). The various components of the cover 50, including the body 54 and the first and second portions 60, 62 are marked accordingly. Each of the first and second portions may include a plurality of ribs or braces 96 to help provide strength and rigidity to the cover and, in the case of brace 96a, to help support the hinge 66 and projections 90, 92.

The projections 90 and 92 may extend from the first portion 60 and second portion 62, respectively, for a prolonged length, or they may simply be large enough to engage the locking member 100 to force the first portion and second portion into the second, closed position shown in FIG. 3. As shown in FIG. 4, the projections 90, 92 may each have a notch 104, 106 formed therein. The notches 104, 106 are formed by a portion of the projections 90, 92 extending away from each other adjacent the locking member 100. This facilitates turning of the locking member 100 so that the head 110 of the locking member 100 engages the projections and pushes them outwardly as it turns. As the notches 104, 106 extend a short distance beyond the long axis of the head, it also allows the two projections 90, 92 to come closer together (i.e. the notches accommodate the head 110, so as to allow the first portion 60 and the second portion 62 of the body 54 to open as wide as possible.

The notches 104, 106 may further include a channel 114 (only the channel on projection 90 being visible) which receives the head 110 of the locking member 100. As the locking member 100 is shown as an eye-bolt, the curved channel 114 may be sized and shaped to snuggly receive a portion of the head 110 of the locking member 100 when it is turned perpendicular to the long axis of the hinge 66. This allows the head 110 of the locking member 100 to snap into place and be biased into the position shown in FIG. 4. In other words, once the head 110 has been turned perpendicular to the long axis of the hinge 66, the upward (central) curvature of each of the channels tends to resist the head returning back into the orientation wherein the head is generally parallel to the long axis of the hinge. Thus, unless affirmatively acted upon, the head 110 will interact with the channel 114 in the notches 104, 106 to remain in place and thereby lock the cover 50 into the second, closed position shown in FIG. 3.

In use, the cover 50 will typically be grasped by the use of a hot stick or shotgun stick 150. The hotstick/shotgun stick 150 has an actuatable grasping element 154 which can open and be inserted into a void 118 in the head 110 of the locking member 100. In an eyebolt, the void is formed by the eye. Grasping the locking member 100 would typically occur while the head 110 of the locking member 100 is turned so that its long axis is generally parallel with the long axis of the hinge 66. This may occur prior to or after any modifications are made to the fingers 78 to accommodate the structures being completely or partially enclosed. In such an orientation, the first portion 60 and the second portion 62 would be in the first, open position, as shown in FIG. 2.

The lineman can then extend the hot stick/shotgun stick 150 and use the flanges 70 to help direct the cover 50 onto the structure(s) to be covered. Once the structure(s) are in the void 58 (FIG. 2), the lineman need only rotate the hot stick/shotgun stick 150. One or both of the first portion 60 and second portion 62 will engage the structure(s) being covered so as to limit rotation of the cover 50. The head 110 of the locking member 100 will continue to rotate and push the projections 90, 92 away from one another, thereby causing the first portion 60 and second portion 62 of the body 54 to move toward each other. This may continue until the head 110 has rotated approximately 90 degrees and the head nests in the channels 114 in the projections. At the same time, the body 54 of the cover 50 has moved from the first, open position into the second, closed position. The nested head 110 locks the cover 50 into the second, closed position, thereby safely enclosing the electrical system components disposed within the void.

Figure 5:
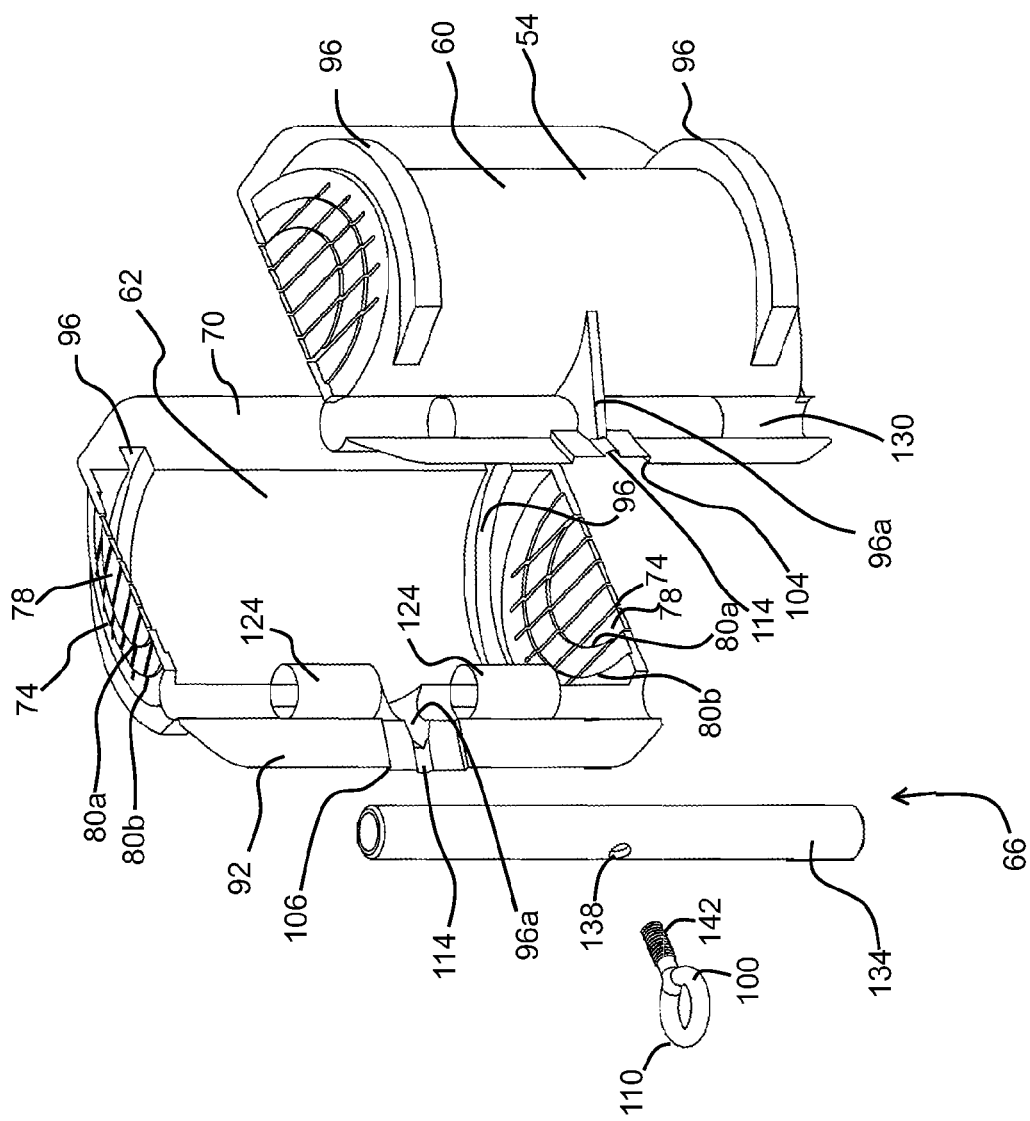
FIG. 5 shows an exploded view of the cover shown in FIGS. 1 through 4.

Turning now to FIG. 5, there is shown an exploded view of the cover 50. The first portion 60 and the second portion 62 have been pulled apart. It can be seen that the projections 90 and 92 can be formed integrally with the first portion 60 and second portion 62, respectively. Each portion may be made, for example, from pressure forming plastics or other generally non-conductive material. In all, the entire cover may be made from four easily moldable, formed parts, thus providing a very cost effective construction.

The hinge 66 may be formed by a pair of rounded arms or tubes 124 on one portion, and a semi-cylindrical form 130 on the other portion. In the alternative, each of the portions could simply have tubes which are disposable in alignment with each other. The hinge 66 may also include an elongate shaft or tube 134 which passes through the arms/tubes of the first portion and second portion to hold them together and to give them an axle about which they can rotate. The elongate shaft or tube 134 may be formed from common PVC or other plastic tubing.

The elongate shaft or tube 134 may have a hole 138 formed therein for receiving the locking member 100. The hole 138 may be threaded so as to receive and secure a threaded portion 142 of the locking member. The threads allow the locking member 100 to rotate relative to the hinge 66, but keep the locking member from simply pulling out due to pressure on the head 110 of the locking member from the projections 90, 92.

Figure 6:
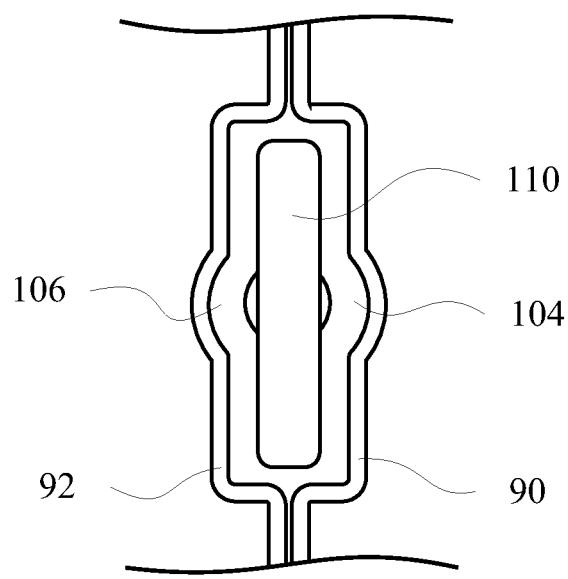
FIG. 6 shows a close-up view of the locking member and projections of the cover in a first, open or unlocked position.
Figure 7:
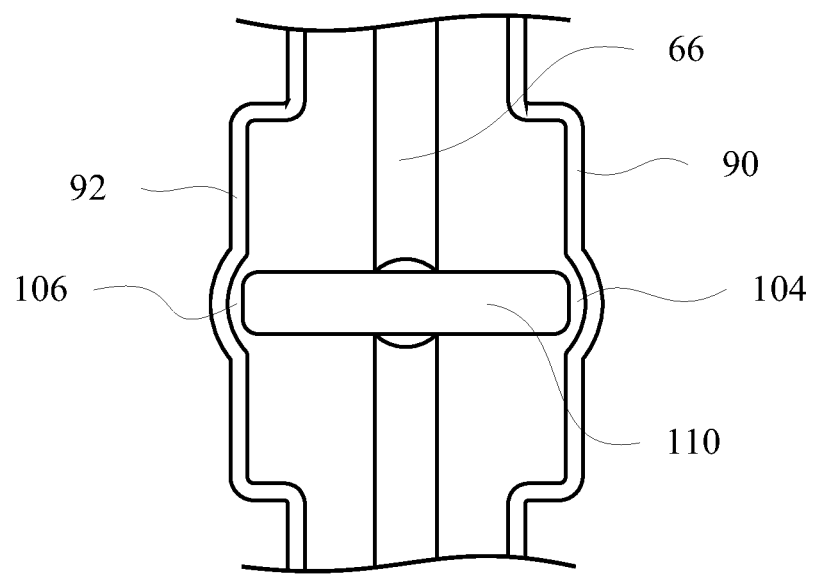
FIG. 7 shows a close-up view of the locking member and projections of the cover in a second, closed or locked position.

Turning now to FIGS. 6 and 7, there is shown a close-up view of the locking member 100 and the projections 90, 92. In FIG. 6, the locking member 100 is disposed so that the head 110 is generally parallel to the long axis of the hinge 66, which correlates with the cover 50 being in the first, open position shown in FIG. 2. In other words, the head 110 of the locking member 100 is not engaging the projections 90, 92 in such a manner as to force them apart from one another. Moreover, the notches 104, 106 allow the long axis of the projections 90, 92 to be co-planar with the length of the head 110 allowing the projections to come close to or actually touch one another. This enables the body 54 to open widely, to thereby facilitate placement of an isolator bushing or other component in the void 58.

Turning specifically to FIG. 7, the head 110 of the locking member 100 has been rotated approximately 90 degrees from its position shown in FIG. 6 so that its length or long axis runs generally perpendicular to the long axis of the hinge 66. In such a configuration, the head 110 forces the projections 90, 92 away from one another, thereby forcing the portions 60, 62 of the body 54 to come together as shown in FIG. 3. The ends of the head 110 nest in the channels 114 formed in the notches 104, 106, thereby centering the head and preventing force on the body from turning the head 110 back into the position shown in FIG. 6. Until sufficient rotational force is applied to the head 110 to overcome the upward curvature of one side of the channel 114, the head 110 is held securely in place, thereby preventing the head from turning and the body 54 from opening.

One advantage of the present invention is that the cover 50 is relatively easy to remove in the event that the electrical components need to be changed or serviced. A lineman need merely grasp the head 110 of the locking member 100 with a hotstick/shotgun stick or the like (or by bare hand when safe) and rotate the locking member so that the ends of the head are no longer in the channels. Pulling rearwardly on the locking member 100 will cause the first and second portions 60, 62 of the body 54 to engage the structure and push them toward the first, open position shown in FIG. 2, allowing the covered component to be withdrawn. When servicing is complete, the cover 50 can be moved so that the component is back in the void 58 and then the locking member 100 rotated to reclose the cover. It will be appreciated that each component in the cover 50 can be made of non-conductive material, thereby lessening the risk of an arc or a short circuit situation occurring.

Thus there is disclosed an electrical component cover which protects electrical equipment and wildlife. The cover minimizes the risk of wildlife inadvertently completing an electrical circuit and killing the wildlife while potentially damaging the electrical components. Those skilled in the art will appreciate that there are numerous modifications which may be made in light of the present disclosure. The appended claims are intended to cover such modifications.

What is claimed is:

1. An electrical component cover comprising: a body having a first portion and a second portion, the first portion and second portion being attachable to one another so as to form a void and so as to pivot toward and away from one another so as to have a first, open position wherein an electrical component may be moved into the void, and a second, closed position for maintaining the electrical component in the void, the body further comprising at least one projection; and a locking member disposed in communication with the body, the locking member engaging the at least one projection and being rotatable between a first position wherein the locking member does not forcefully engage the at least one projection so that the body may be in the first, open position, and a second position wherein the locking member engages the projection and maintains the body portion in the second, closed position; and wherein the at least one projection comprises a first projection and a second projection, and wherein rotating the locking member from the first position to the second position moves the first projection and the second projection away from one another.

2. The electrical component cover of claim 1, wherein the first projection is integrally formed with the first portion of the body and the second projection is integrally formed with the second portion of the body.

3. The electrical component cover of claim 1, further comprising a hinge connecting the first portion and the second portion to allow the first portion and second portion to move with respect to one another.

4. The electrical component cover of claim 3, wherein the locking member is attached to the hinge.

5. The electrical component cover of claim 3, wherein the hinge comprises a threaded hole.

6. The electrical component cover of claim 1, wherein the locking member comprises an eye-bolt.

7. The electrical component cover of claim 1, wherein the first projection has a notch and the second projection has a notch.

8. The electrical component cover of claim 7, wherein the notch is disposed adjacent the locking member.

9. The electrical component cover of claim 8, wherein each of the notches has a channel formed therein for receiving an end of the locking member when the locking member is disposed in the second position.

10. An electrical component cover comprising:
   a body having a first portion and a second portion hingedly attached to one another, the first portion and the second portion defining a void for receiving an electrical component, and the first portion and second portion having an upper end and a lower end with a plurality of slots formed into at least one of the upper end and lower end;
   a hinge formed by the first portion of the body, the second portion of the body and a tube engaging the first portion of the body and the second portion of the body;
   a pair of projections extending from the first portion and the second portion and disposed functionally on the opposite side of the hinge from the first portion and second portion; and
   a locking member disposed in communication with the pair of projections, the locking member being rotatable between a first position, wherein the pair of projections can move toward each other, and a second position wherein the locking member engages the projections so as to limit the ability of the projections to move toward one another; and wherein the tube has a hole formed therein for receiving the locking member.

11. The electrical component cover of claim 10, wherein at least one of the upper end and lower end of the first portion and second portion further comprise a plurality of scores formed therein.

12. The electrical component cover of claim 11, wherein the upper end and lower end of the first portion and second portion have a plurality of slots and a plurality of scores formed therein.

13. The electrical component cover of claim 10, wherein the hole in the tube is threaded.

14. The electrical component cover of claim 10, wherein the pair of projections comprises a first projection having a notch and a second projection having a notch.

15. The electrical component cover of claim 10, the at least one projection comprises a first projection and a second projection, and wherein rotating the locking member from the first position to the second position moves the projections away from one another.

16. A method for protecting a component of an electrical system, the method comprising:
    selecting a body having a first portion and a second portion which come together to define a void, the first portion and second portion having an upper end and a lower end with a plurality of scores formed therein, the first portion and the second portion being attached by a hinge, and a pair of projections extending from the first portion and the second portion to positions on generally opposite sides of the hinge from the first portion and the second portion, with a locking member which selectively engages the pair of projections, the first portion and the second portion having a first, open position and a second, closed position;
    breaking or bending at the scores to form an opening of a desired size;
    rotating the locking member approximately 90 degrees from the first position to the second position to engage the projections to hold the projections away from one another and thereby hold the first portion and the second portion in engagement with one another in a second, closed position.

17. An electrical component cover comprising:
    a body having a first portion and a second portion, the first portion and second portion being attachable to one another so as to form a void and so as to pivot toward and away from one another so as to have a first, open position wherein an electrical component may be moved into the void, and a second, closed position for maintaining the electrical component in the void, the body further comprising at least one projection; and
    a locking member disposed in communication with the body, the locking member engaging the at least one projection and being rotatable between a first position wherein the locking member does not forcefully engage the at least one projection so that the body may be in the first, open position, and a second position wherein the locking member engages the projection and maintains the body portion in the second, closed position; and
    a hinge connecting the first portion and the second portion and wherein the locking member is attached to the hinge.

18. The electrical component cover of claim 17, wherein the hinge comprises a threaded hole.

19. An electrical component cover comprising:
    a body having a first portion and a second portion, the first portion and second portion being attachable to one another so as to form a void and so as to pivot toward and away from one another so as to have a first, opening position wherein an electrical component may be moved into the void, and a second, closed position for maintaining the electrical component in the void, the body further comprising at least one projection, the at least one projection comprising a first projection having a notch and a second projection having a notch; and
    a locking member disposed in communication with the body, the locking member engaging the at least one projection and being rotatable between a first position wherein the locking member does not forcefully engage the at least one projection so that the body may be in the first, open position, and a second position wherein the locking member engages the projection and maintains the body portion in the second, closed position.

20. The electrical component cover of claim 19, wherein each notch is disposed adjacent the locking member.

21. The electrical component cover of claim 19, wherein each of the notches has a channel formed therein for receiving an end of the locking member when the locking member is disposed in the second position.

* * * * *